United States Patent
Dong et al.

(10) Patent No.: US 10,222,807 B2
(45) Date of Patent: Mar. 5, 2019

(54) METHOD, MOBILE DEVICE AND COMPUTER STORAGE MEDIUM FOR PROCESSING INFORMATION

(71) Applicant: Ninebot (Beijing) Tech. Co., Ltd, Beijing (CN)

(72) Inventors: Shiqian Dong, Beijing (CN); Ye Wang, Beijing (CN); Li Pu, Beijing (CN)

(73) Assignee: NINEBOT (BEIJING) TECH CO., LTD., Beijing (CN)

( * ) Notice: Subject to any disclaimer, the term of this patent is extended or adjusted under 35 U.S.C. 154(b) by 168 days.

(21) Appl. No.: 15/325,195

(22) PCT Filed: Oct. 8, 2016

(86) PCT No.: PCT/CN2016/101454
§ 371 (c)(1),
(2) Date: Jan. 10, 2017

(87) PCT Pub. No.: WO2017/166768
PCT Pub. Date: Oct. 5, 2017

(65) Prior Publication Data
US 2018/0095479 A1    Apr. 5, 2018

(30) Foreign Application Priority Data
Mar. 31, 2016    (CN) .......................... 2016 1 0200697

(51) Int. Cl.
*G05D 1/00* (2006.01)
*G05D 1/02* (2006.01)
(Continued)

(52) U.S. Cl.
CPC .............. *G05D 1/12* (2013.01); *G01C 21/04* (2013.01); *G01C 21/20* (2013.01); *G05D 1/0011* (2013.01);
(Continued)

(58) Field of Classification Search
CPC ...... G01C 21/04; G01C 21/20; G05D 1/0011; G05D 1/0088; G05D 1/02; H04W 4/02
(Continued)

(56) References Cited

U.S. PATENT DOCUMENTS 8,793,069 B2    7/2014  Kuroda
8,880,272 B1   11/2014  Ferguson
(Continued)

FOREIGN PATENT DOCUMENTS

CN    101630162 A    1/2010
CN    102927985 A    2/2013
(Continued)

OTHER PUBLICATIONS

International Search Report in international application No. PCT/CN2016/101454, dated Jan. 5, 2017, 2 pgs.
(Continued)

*Primary Examiner* — Maceeh Anwari
(74) *Attorney, Agent, or Firm* — Cooper Legal Group, LLC

(57) ABSTRACT

The disclosure discloses a method for processing information, comprising: collecting, at a preset frequency, location information of a target object tracked by a mobile device; extracting the piece of location information meeting a first condition from the collected pieces of location information, and saving the extracted piece of location information in a queue of target waypoints, wherein each piece of location information in the queue of target waypoints is configured to describe a target waypoint, and the pieces of location information of the target waypoints of the queue of target waypoints are arranged in the chronological order for collecting the pieces of location information; generating a corresponding control instruction according to the piece of location information of the target waypoint saved in the
(Continued)

queue of target waypoints, wherein the control instruction is configured to control the mobile device to move towards the respective target waypoints described in the queue of target waypoints in order. The disclosure also discloses a mobile device and computer storage medium for implementing the method for processing information.

15 Claims, 3 Drawing Sheets

(51) Int. Cl.
*G05D 1/12* (2006.01)
*H04W 4/02* (2018.01)
*G01C 21/04* (2006.01)
*G01C 21/20* (2006.01)
*H04W 64/00* (2009.01)

(52) U.S. Cl.
CPC .............. *G05D 1/0088* (2013.01); *G05D 1/02* (2013.01); *H04W 4/02* (2013.01); *H04W 64/006* (2013.01)

(58) Field of Classification Search
USPC .......................................................... 701/25
See application file for complete search history.

(56) References Cited

U.S. PATENT DOCUMENTS

| | | | |
|---|---|---|---|
| 9,460,622 | B1 | 10/2016 | Ferguson et al. |
| 2006/0106496 | A1* | 5/2006 | Okamoto ............. G05D 1/0272 700/253 |
| 2009/0254235 | A1 | 10/2009 | Kuroda |
| 2010/0049374 | A1 | 2/2010 | Ferrin |
| 2012/0123641 | A1 | 5/2012 | Ferrin |

FOREIGN PATENT DOCUMENTS

| | | |
|---|---|---|
| CN | 103294054 A | 9/2013 |
| CN | 103809174 A | 5/2014 |
| CN | 103869814 A | 6/2014 |
| CN | 104260092 A | 1/2015 |
| CN | 104731102 A | 6/2015 |
| CN | 104850360 A | 8/2015 |
| CN | 105446605 A | 3/2016 |
| CN | 105867368 A | 8/2016 |
| JP | 2000127974 A | 5/2000 |

OTHER PUBLICATIONS

Supplementary European Search Report in European application No. 16896538.2, dated Nov. 21, 2018, 9 pgs.
"Trajectory Data Mining : An Overview", May 2015, Yu Zheng, ACM Transactions on Intelligent Systems and Technology (TIST), vol. 6, No. 3, Article 1, 41 pgs.

* cited by examiner

METHOD, MOBILE DEVICE AND COMPUTER STORAGE MEDIUM FOR PROCESSING INFORMATION

TECHNICAL FIELD

The disclosure relates to the field of target tracking technologies, and in particular to a method, a mobile device and a computer storage medium for processing information.

BACKGROUND

An autonomous mobile device refers to a device capable of realizing autonomous movement according to information acquired by the device itself without external control, for example, realizing autonomous movement control (for example, obstacle avoidance) according to a detection on an external environment, or autonomous movement control based on target tracking, and so on. Based on the dimensions of the movement, autonomous mobile devices at least may be classified into two-dimensional autonomous mobile devices (for example, autonomous mobile device on ground), three-dimensional autonomous mobile devices (for example, unmanned aerial vehicle), etc. Target tracking is a common skill that the autonomous mobile device needs to be equipped with.

In existing technologies, methods for target tracking are to perform closed-loop control on a location of an autonomous mobile device relative to a tracked target object. Since the tracking path of the autonomous mobile device itself is uncontrollable, when the target object bypasses an obstacle, as shown in FIG. 1, the autonomous mobile device tends to collide with the obstacle.

SUMMARY

In order to solve the technical problem in existing technologies, it is expected to provide a method, a mobile device and a computer storage medium for processing information in the embodiments of the disclosure.

The embodiment of the disclosure is implemented as follows.

The embodiment of the disclosure provides a method for processing information, applied to a mobile device, including:

collecting, at a preset frequency, pieces of location information of a target object tracked by the mobile device;

extracting the piece of location information meeting a first condition from the collected pieces of location information, and saving the extracted piece of location information in a queue of target waypoints, wherein each piece of location information in the queue of target waypoints is configured to describe a target waypoint, and the pieces of location information of the target waypoints of the queue of target waypoints are arranged in the chronological order for collecting the pieces of location information; and generating a corresponding control instruction according to the piece of location information of the target waypoint saved in the queue of target waypoints, wherein the control instruction is configured to control the mobile device to move towards the respective target waypoints described in the queue of target waypoints in order.

In the above solution, the extracting the piece of location information meeting a first condition from the collected pieces of location information and saving the extracted piece of location information in a queue of target waypoints includes:

when a piece of location information of the target object is collected, judging whether the queue of target waypoints is null; if the queue of target waypoints is null, saving the collected piece of location information in the queue of target waypoints;

if the queue of target waypoints is not null, judging, according to the collected piece of location information and the latest location information saved in the queue of target waypoints, whether a first condition is met; when it is judged that the first condition is met, saving the collected piece of location information in the queue of target waypoints, and when it is judged that the first condition is not met, not saving the collected piece of location information in the queue of target waypoints.

In the above solution, the judging, according to the collected piece of location information and the latest location information saved in the queue of target waypoints, whether a first condition is met includes:

judging, according to the collected piece of location information and the latest location information saved in the queue of target waypoints, whether the distance between a target waypoint corresponding to the collected piece of location information and a target waypoint corresponding to the latest location information saved in the queue of target waypoints reaches a preset first distance threshold; if the distance reaches the preset first distance threshold, it is judged that the first condition is met; if the distance fails to reach the preset first distance threshold, it is judged that the first condition is not met.

In the above solution, the step that the pieces of location information of the target waypoints of the queue of target waypoints are arranged in the chronological order for collecting the pieces of location information includes:

according to the chronological order for collecting the pieces of location information, arranging the collected oldest location information at the end of the queue of target waypoints and arranging the collected latest location information at the head of the queue of target waypoints, wherein the pieces of location information are arranged from the end of the queue to the head of the queue in chronological order for collecting the pieces of the location information.

After generating the control instruction, the method further includes:

controlling, according to the control instruction, the mobile device to move towards the waypoints corresponding to the respective pieces of location information from the end to the head of the queue of target waypoints in turn; and once the mobile device reaches the waypoint corresponding to the piece of location information at the end of the queue, deleting the piece of location information at the end of the queue from the queue of target waypoints.

In the above solution, the piece of location information of the target waypoint saved in the queue of target waypoints includes: a relative location vector between each target waypoint and the mobile device;

the generating a corresponding control instruction according to the piece of location information of the target waypoint saved in the queue of target waypoints includes:

according to a relative location vector $\{w_0, w_1, w_2, \ldots w_n\}$ between the mobile device and each target waypoint saved in the queue of target waypoints, generating a control instruction enabling the mobile device to move towards the respective target waypoints from the end to the head of the queue of target waypoints in turn; In the control process, acquiring a movement distance vector $\Delta X$ and a rotation angle vector $\Delta \theta$ of the mobile device according to a preset sampling period; in each sampling period, transforming the relative location vector $\{w_0, w_1, w_2, \ldots w_n\}$ according to the acquired movement distance vector $\Delta X$ and rotation angle vector $\Delta\theta$ based on a formula $\{(w_i-\Delta X)T(\Delta\theta)\}$ to acquire a transformed relative location vector, where i=0, 1, 2, ... n, $T(\Delta\theta)$ represents a rotation transformation matrix;

correspondingly, the control instruction is generated based on the latest relative location vector.

The embodiment of the disclosure further provides a mobile device, including:

a location information collection unit which is configured to collect, at a preset frequency, pieces of location information of a target object tracked by the mobile device;

a management unit for a queue of target waypoints which is configured to extract the piece of location information meeting a first condition from the collected pieces of location information, and save the extracted piece of location information in a queue of target waypoints, wherein each piece of location information in the queue of target waypoints is configured to describe a target waypoint, and the pieces of location information of the target waypoints of the queue of target waypoints are arranged in the chronological order for collecting the pieces of location information; and a mobile control unit which is configured to generate a corresponding control instruction according to the piece of location information of the target waypoint saved in the queue of target waypoints, wherein the control instruction is configured to control the mobile device to move towards the respective target waypoints described in the queue of target waypoints in order.

In the above solution, the management unit for the queue of target waypoints is further configured to:

when a piece of location information of the target object is collected by the location information collection unit, judge whether the queue of target waypoints is null; if the queue of target waypoints is null, save the collected piece of location information in the queue of target waypoints;

if the queue of target waypoints is not null, judge, according to the collected piece of location information and the latest location information saved in the queue of target waypoints, whether a first condition is met; when it is judged that the first condition is met, save the collected piece of location information in the queue of target waypoints, and when it is judged that the first condition is not met, not save the collected piece of location information in the queue of target waypoints.

In the above solution, the management unit for the queue of target waypoints is further configured to:

judge, according to the collected piece of location information and the latest location information saved in the queue of target waypoints, whether the distance between a target waypoint corresponding to the collected piece of location information and a target waypoint corresponding to the latest location information saved in the queue of target waypoints reaches a preset first distance threshold; if the distance reaches the preset first distance threshold, it is judged that the first condition is met; if the distance fails to reach the preset first distance threshold, it is judged that the first condition is not met.

In the above solution, the management unit for the queue of target waypoints is further configured to: according to the chronological order for collecting the pieces of location information, arrange the collected oldest location information at the end of the queue of target waypoints and arrange the collected latest location information at the head of the queue of target waypoints, wherein the pieces of location information are arranged from the end of the queue to the head of the queue in chronological order for collecting the pieces of the location information.

The mobile control unit is further configured to: after generating the control instruction, control, according to the control instruction, the mobile device to move towards the waypoints corresponding to the respective pieces of location information from the end to the head of the queue of target waypoints in turn; and once the mobile device reaches the waypoint corresponding to the piece of location information at the end of the queue, notify the management unit for the queue of target waypoints to delete the location information at the end of the queue from the queue of target waypoints.

In the above solution, the piece of location information of the target waypoint saved in the queue of target waypoints includes: a relative location vector between each target waypoint and the mobile device.

The mobile control unit is further configured to: according to a relative location vector $\{w_0, w_1, w_2, \ldots w_n\}$ between the mobile device and each target waypoint saved in the queue of target waypoints, generate a control instruction enabling the mobile device to move towards the respective target waypoints from the end to the head of the queue of target waypoints in turn; In the control process, acquire a movement distance vector $\Delta X$ and a rotation angle vector $\Delta\theta$ of the mobile device according to a preset sampling period; in each sampling period, transform the relative location vector $\{w_0, w_1, w_2, \ldots w_n\}$ according to the acquired movement distance vector $\Delta X$ and rotation angle vector $\Delta\theta$ based on a formula $\{(w_i-\Delta X)T(\Delta\theta)\}$ to acquire a transformed relative location vector, where i=0, 1, 2, ... n, $T(\Delta\theta)$ represents a rotation transformation matrix;

correspondingly, the control instruction is generated based on the latest relative location vector.

The embodiment of the disclosure further provides a computer storage medium storing a computer program that is configured to execute the above method for processing information.

According to the method, mobile device and computer storage medium for processing information provided by the embodiment of the disclosure, the mobile device is enabled to record each target waypoint that the tracked target object passes, such that the mobile device is controlled to move towards the respective target waypoints in order, that is to say, the mobile device moves along the trace of the target object. In this way, the mobile device can better avoid obstacles during the tracking process, because the trace of the target object often has no obstacle. Moreover, since the tracking path of the mobile device provided by the embodiment of the disclosure is controllable (that is, the mobile terminal moves along the trace of the target object), even if the target object bypasses an obstacle, the mobile device can track the target well, and won't collide with the obstacle.

DETAILED DESCRIPTION

The solution of the disclosure is illustrated below in more detail in conjunction with accompanying drawings and specific embodiments.

Embodiment 1

Figure 1:
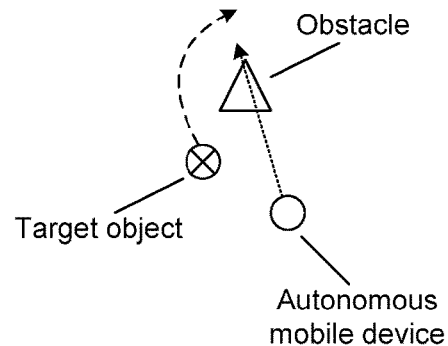
FIG. 1 is a schematic view illustrating a case where an autonomous mobile device, which tracks a target object, collides with an obstacle when the target object bypasses the obstacle in existing technologies.
Figure 2:
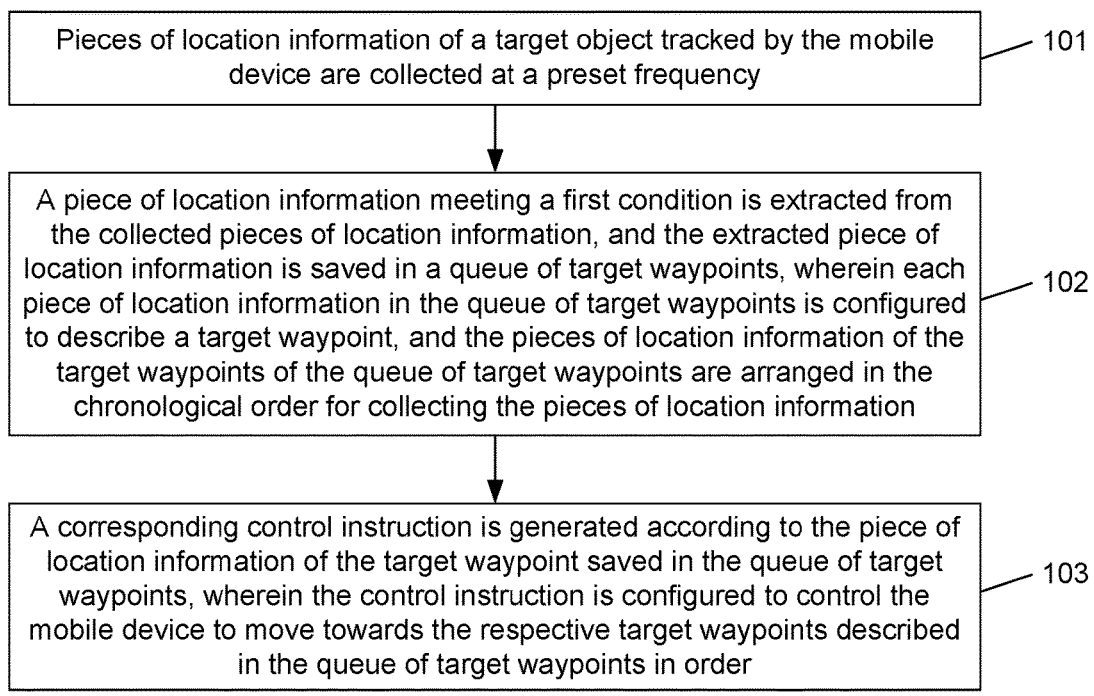
FIG. 2 is a flowchart of a method for processing information in an Embodiment 1 of the disclosure.

The Embodiment 1 of the disclosure provides a method for processing information, which is applied to a mobile device that can realize an autonomous movement. The so called autonomous movement refers to an autonomous movement implemented according to information acquired by the mobile device itself without external control. As shown in FIG. 2, the method mainly includes the steps as follows.

In Step 101, pieces of location information of a target object tracked by the mobile device are collected in a preset frequency.

The sampling frequency for collecting the pieces of location information is preset in the mobile device. The mobile device collects, at the preset sampling frequency, the pieces of location information of the target object tracked by the mobile device. There are various methods for acquiring the pieces of location information, which are applicable in the embodiment of the disclosure. The methods at least include a method for collecting the absolute location information (for example, Global Positioning System (GPS) location information) of the target object tracked by the mobile device, and a method for collecting the relative location information of the target object tracked by the mobile device. The relative location information refers to the location information of the target object relative to the mobile device, for example, relative distance, relative angle, etc.

In particular, an Ultra Wideband (UWB) based method may be adopted to acquire the relative location information of the target object relative to the mobile device. In a specific implementation, a UWB module may be installed on the mobile device, and a UWB beacon is installed on the target object. The UWB module transmits a signal to the UWB beacon and receives a signal reflected by the UWB beacon. The relative distance d between the UWB beacon and the UWB unit may be measured by using a Time Of Flight (TOF) based technology. In the TOF based technology, a time difference between the emission and reflection of a radio wave (or optical wave, sonic wave, etc.) and then translates the time difference into a relative distance d. The relative angle θ between the UWB beacon and the UWB unit may be measured by using an Angle of arrival (AOA) based technology. The AOA is a location algorithm based on signal AOA and may calculate the relative direction or relative angle between a receiving node and an anchor node by sensing the direction, along which a signal from an emitting node arrives, by means of hardware devices.

Of course, the embodiment of the disclosure is not limited to the UWB technology to acquire the relative location information between the target object and the mobile device. In a specific implementation, the relative location information between the target object and the mobile device may be acquired by using other technologies, for example, ultra sonic range finder sensor, infrared range finder sensor, sonar, radar, binocular vision and other technologies which will not be enumerated herein in the embodiments of the disclosure.

In Step 102, a piece of location information meeting a first condition is extracted from the collected pieces of location information, and the extracted piece of location information is stored in a queue of target waypoints. Each piece of location information in the queue of target waypoints is configured to describe a target waypoint, and the pieces of location information of the target waypoints of the queue of target waypoints are arranged in the chronological order for collecting the pieces of location information.

In the specific implementation of Step 102, when a piece of location information of the target object is collected, it is judged whether the queue of target waypoints is null. If the queue of target waypoints is null, the collected piece of location information is saved in the queue of target waypoints. If the queue of target waypoints is not null, it is judged, according to the collected piece of location information and the latest location information saved in the queue of target waypoints, whether a first condition is met. When it is judged that the first condition is met, the collected piece of location information is saved in the queue of target waypoints. When it is judged that the first condition is not met, the collected piece of location information is not saved in the queue of target waypoints.

In particular, the step that it is judged, according to the collected piece of location information and the latest location information saved in the queue of target waypoints, whether a first condition is met includes:

it is judged, according to the collected piece of location information and the latest location information saved in the queue of target waypoints, whether the distance between a target waypoint corresponding to the collected piece of location information and a target waypoint corresponding to the latest location information saved in the queue of target waypoints reaches a preset first distance threshold. If the distance reaches the preset first distance threshold, it is judged that the first condition is met. If the distance fails to reach the preset first distance threshold, it is judged that the first condition is not met.

For example, when the mobile device starts collection of a piece of initial location information of the target object, the corresponding queue of target waypoints is null. At this time the mobile device directly saves the piece of initial location information in the queue of target waypoints. The mobile device then compares the piece of location information, which is collected subsequently, with the piece of initial location information and judges whether the distance between the two locations reaches a preset first distance threshold. For the collected piece of location information not reaching the first distance threshold, the mobile device does not save it in the queue of target waypoints. Only when the distance between the collected piece of location information and the piece of initial location information reaches the preset first distance threshold, the mobile device saves the collected piece of location information reaching the first distance threshold, as the head of the current queue of target waypoints, in the queue of target waypoints. For convenient description, this piece of location information is called a first piece of location information meeting the first condition. When the location information of the target object is subsequently collected by the mobile device, the mobile device compares this piece of location information with the first piece of location information meeting the first condition and judges whether the distance between the two locations reaches the preset first distance threshold. Similarly, only when the distance between this collected piece of location information and the first piece of location information meeting the first condition reaches the preset first distance threshold, the mobile device saves the collected piece of location information, as the queue head of the current queue of target waypoints, in the queue of target waypoints. For convenient description, this piece of location information is called a second piece of location information meeting the first condition. Generally, it is assumed that the head of the current queue of target waypoints is an nth (which is greater than or equal to 1) piece of location information meeting the first condition. When the location information of the target object is collected by the mobile device, the mobile device will compare this piece of location information with the nth piece of location information meeting the first condition at the head of the queue and judge whether the distance between the two locations reaches the preset first distance threshold. Only when the distance reaches the preset first distance threshold, the mobile device saves the collected piece of location information of the target object, as a new queue head of the current queue of target waypoints, in the queue of target waypoints. This piece of location information is called the (n+1)th piece of location information meeting the first condition.

That is to say, in the embodiment of the disclosure, Steps 101-102 are implemented to record the location information of the target object with sufficient change in the location (compared with the first distance threshold), and the pieces of location information are corresponding to the respective target waypoints respectively. These target waypoints are connected in turn to form a path, which is used for describing the movement trace of the target object.

In Step 103, a corresponding control instruction is generated according to the piece of location information of the target waypoint saved in the queue of target waypoints, wherein the control instruction is configured to control the mobile device to move towards the respective target waypoints described in the queue of target waypoints in order.

The step that location information of the target waypoints of the queue of target waypoints are arranged in the chronological order for collecting the pieces of location information includes:

according to the chronological order for collecting the pieces of location information, the collected oldest location information is arranged at the end of the queue of target waypoints and the collected latest location information is arranged at the head of the queue of target waypoints, wherein the pieces of location information are arranged from the end of the queue to the head of the queue in chronological order for collecting the pieces of the location information.

Correspondingly, after generating the control instruction, the method further includes:

according to the control instruction, the mobile device is controlled to move towards the waypoints corresponding to the respective pieces of location information from the end to the head of the queue of target waypoints in turn; and once the mobile device reaches the waypoint corresponding to the piece of location information at the end of the queue, the piece of location information at the end of the queue is deleted from the queue of target waypoints.

An example is presented as follows.

It is assumed the respective pieces of location information from the end to the head of the queue of target waypoints in turn are: the piece of initial location information, the first piece of location information meeting the first condition, the second piece of location information meeting the first condition, . . . , the mth piece of location information meeting the first condition.

Then, the generation control instruction is configured to control the mobile device to move towards the following waypoints in turn: the waypoint corresponding to the piece of initial location information, the waypoint corresponding to the first piece of location information meeting the first condition, the waypoint corresponding to the second piece of location information meeting the first condition, . . . , the waypoint corresponding to the mth piece of location information meeting the first condition.

Moreover, when the mobile device reaches the waypoint corresponding to the piece of initial location information, the piece of initial location information is deleted from the queue of target waypoints. When the mobile device reaches the waypoint corresponding to the first piece of location information meeting the first condition, the first piece of location information meeting the first condition is deleted from the queue of target waypoints, and so on. That is to say, when the mobile device reaches a waypoint, the piece of location information corresponding to this waypoint is deleted from the queue of target waypoints.

Figure 3:
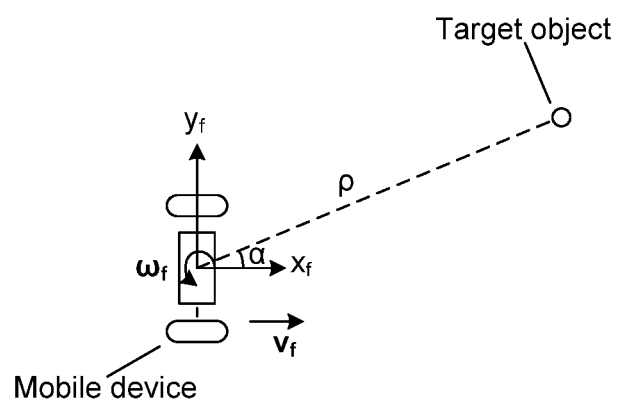
FIG. 3 is a schematic view illustrating the expression of relative location information by a polar coordinate in the embodiment of the disclosure.

In an implementation, the piece of location information of the target waypoint saved in the queue of target waypoints includes: a relative location vector between each target waypoint and the mobile device. The relative location vector may be expressed by a polar coordinate. As shown in FIG. 3, the polar coordinate is expressed as an included angle $\alpha$ and a first radius vector $\rho$, where the first radius vector $\rho$ represents a radius vector from the mobile device to the target object, and the included angle $\alpha$ represents an included angle between the first radius vector $\rho$ and the absolute translational velocity vector $v_f$ of the mobile device. In addition, the translational velocity vector of the mobile device relative to the ground is $v_f$, and the rotational velocity vector of the mobile device relative to the ground is $\omega_f$. The $v_f$ and $\omega_f$ may be measured by a coded disc of the mobile device. The coded disc also is called an Encoder, which is a sensor for converting a rotational motion into an electrical signal and may be used to detect the rotational velocity of vehicle wheels, the rotation angle of mechanical joints and so on.

The step that a corresponding control instruction is generated according to the piece of location information of the target waypoint saved in the queue of target waypoints includes:

according to a relative location vector $\{w_0, w_1, w_2, \ldots w_n\}$ between the mobile device and each target waypoint saved in the queue of target waypoints, a control instruction is generated for enabling the mobile device to move towards the respective target waypoints from the end to the head of the queue of target waypoints in turn. And In the control process, a movement distance vector $\Delta X$ and a rotation angle vector $\Delta \theta$ of the mobile device is acquired according to a preset sampling period. In each sampling period, the relative location vector $\{w_0, w_1, w_2, \ldots w_n\}$ is transformed according to the acquired movement distance vector $\Delta X$ and rotation angle vector $\Delta \theta$ based on a formula $\{(w_i - \Delta X) T(\Delta \theta)\}$ to acquire a transformed relative location vector, where $i=0, 1, 2, \ldots n$, $T(\Delta \theta)$ represents a rotation transformation matrix. The transformed relative location vector is used to describe a new relative location between the path the mobile device moves and the target object.

Figure 4:
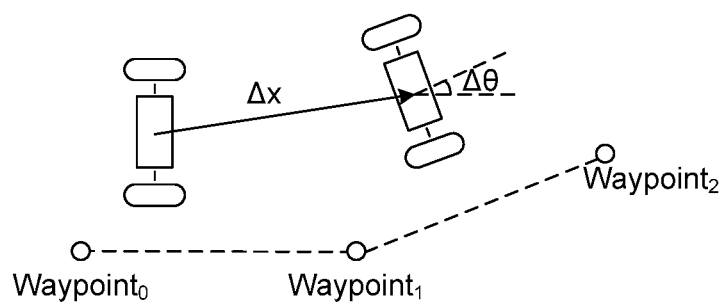
FIG. 4 is a schematic view illustrating the transformation for the relative location vector in the embodiment of the disclosure.

Correspondingly, the control instruction is generated based on the latest relative location vector. For the diagram of the relative location vector transformation, please refer to FIG. 4.

An embodiment of the disclosure for controlling the movement of a mobile device based on the relative location information between the mobile device and a target waypoint is illustrated below. However, it should be noted that the control method of the embodiment of the disclosure is not limited thereto and at least includes the control based on the relative location information between the mobile device and the target waypoint, and the control based on the absolute location information between the mobile device and the target waypoint.

Figure 5:
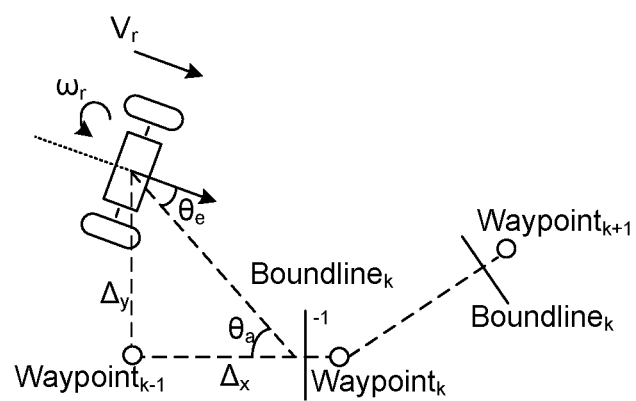
FIG. 5 is a schematic view illustrating the relation between a path the target object travels and a mobile device in the embodiment of the disclosure.

It is assumed the mobile device can perform forward movement and steering movement, but cannot perform lateral movement. The relation between the path the target object travels and the mobile device is as shown in FIG. 5. Waypoint represents each point of the path the target object passes (that is, each waypoint saved in the queue of target waypoints), $\upsilon_f$ represents the translational velocity vector of the mobile device relative to the ground, $\omega_f$ represents the rotational velocity vector of the mobile device relative to the ground. A coordinate system is set up based on a target waypoint, where the positive direction of the X axis of the coordinate system is overlapped with the movement direction of the target object at the waypoint. In the coordinate system, the coordinate of the mobile device relative to the target object is denoted by $(x_0, y_0)$; the location $(x_0, y_0)$ is divided into a first relative location and a second relative location, that is, calculating the deviation $(\Delta x, \Delta y)$ between the mobile device and the waypoint the mobile device needs to approach. The method for calculating $\Delta x$ and $\Delta y$ is not limited in the embodiment of the disclosure.

The purpose of the control in the embodiment of the disclosure is to acquire a control law of making $\Delta x$ and $\Delta y$ converged gradually. By implementing the control law, $\Delta x$ and $\Delta y$ are made converged to zero gradually, such that the mobile device moves to $(x_0, y_0)$ gradually. The control law of making $\Delta x$ and $\Delta y$ converged gradually may be designed as follows respectively:

For $\Delta x$, a control law $\upsilon_r = f_x(\Delta x, t)$ of the forward velocity instruction $\upsilon_r$ is designed for a given mobile device. This control law drives $\Delta x$ to be converged to zero gradually, wherein t represents time. In a specific implementation, the control law may be a Proportion-Integral-Differential (PID) control law, or other control laws, which is not limited in the embodiment of the disclosure.

For $\Delta y$, a following cascade controller with inner loop and outer loop control is designed.

For the outer loop, an approach angle $\theta_\alpha = \Delta y \times k$ in direct proportion to the distance is designed, as shown in FIG. 5, where k represents a proportionality coefficient and $\theta_\alpha$ represents the approach angle. The magnitude of k determines the angle in which the mobile device is tangent to the walking line of the target object. The bigger the k is, the bigger the angle in which the mobile device is tangent to the walking line of the target object is. And the mobile device orientation is corrected to be the same as the walking direction of the target object at a place closer to the walking line of the target object. Generally, the value of k is determined according to experiences and actual debugging.

For the inner loop, a control law $\omega_r = f_y(\theta_e, t)$ for the rotational velocity of the mobile device is designed, where $\theta_e$ represents an error angle between the forward movement direction of the mobile device and the approach angle. The control law will continuously drive $\Delta y$ and $\theta_e$ to be converged to zero, as long as the mobile device is moving forwards. $f_y(\cdot, t)$ control law may be a PID control law, or other control laws which is not limited in the embodiment of the disclosure. The embodiment of the disclosure does not limit the specific calculation method of $\theta_e$. Any methods capable of calculating $\theta_e$ in actual applications are intended to be included in the scope of protection of the embodiment of the disclosure.

In addition, in the embodiment of the disclosure, an arrival boundline may also be set for each waypoint. For example, using the distance from a corresponding waypoint to describe the corresponding boundline. For instance, the place with a distance of 3 cm from a certain waypoint is set as the boundline. When the mobile device moves to cross the boundline, it is considered that the mobile device reaches the corresponding waypoint, then the location information of the waypoint is deleted from the queue of target waypoints. The mobile device then moves towards a next target waypoint in the queue of target waypoints. The mobile device moves along a path line, which is a series of line segments connecting adjacent waypoints. The boundline is set to enable a program to judge two waypoints which the path line the mobile device should move along consists of. When the mobile device is to walk the entire current path line, the mobile device will cross the boundline. After the mobile device crosses the boundline, the program will control the mobile device to move along a next path line.

By implementing the Embodiment 1 of the disclosure, the mobile device can record each target waypoint that the tracked target object passes, thereby controlling the mobile device to move towards the respective target waypoints in order. That is to say, the mobile device moves along the trace of the target object. In this way, the mobile device can better avoid obstacles during the tracking process, because the trace of the target object often has no obstacle. Moreover, since the tracking path of the mobile device provided by the embodiment of the disclosure is controllable (that is, the mobile device moves along the trace of the target object), even if the target object bypasses an obstacle, the mobile device can track the target well, and won't collide with the obstacle.

Embodiment 2

Figure 6:
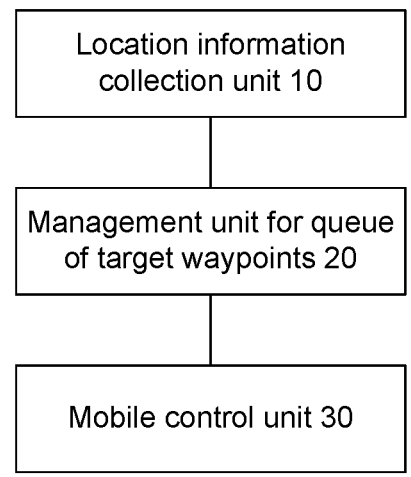
FIG. 6 is a schematic view of a structure of a mobile device in an embodiment 2 of the disclosure.

Under the same inventive concept, the Embodiment 2 of the disclosure further provides a mobile device corresponding to the method for processing information in the Embodiment 1 of the disclosure. As shown in FIG. 6, the mobile device mainly includes a location information collection unit 10, a management unit 20 for a queue of target waypoints, and a mobile control unit 30.

The location information collection unit 10 is configured to collect, at a preset frequency, pieces of location information of a target object tracked by the mobile device.

The managements unit 20 for the queue of target waypoints is configured to extract the piece of location information meeting a first condition from the collected pieces of location information, and save the extracted piece of location information in a queue of target waypoints, wherein each piece of location information in the queue of target waypoints is configured to describe a target waypoint, and the pieces of location information of the target waypoints of the queue of target waypoints are arranged in the chronological order for collecting the pieces of location information.

The mobile control unit 30 is configured to generate a corresponding control instruction according to the piece of location information of the target waypoint saved in the queue of target waypoints, wherein the control instruction is configured to control the mobile device to move towards the respective target waypoints described in the queue of target waypoints in order.

In one implementation, the management unit 20 for the queue of target waypoints is further configured to:

when the location information of the target object is collected by the location information collection unit 10, judge whether the queue of target waypoints is null; if the queue of target waypoints is null, save the collected piece of location information in the queue of target waypoints;

if the queue of target waypoints is not null, judge, according to the collected piece of location information and the latest location information saved in the queue of target waypoints, whether a first condition is met; when it is judged that the first condition is met, save the collected piece of location information in the queue of target waypoints, and when it is judged that the first condition is not met, not save the collected piece of location information in the queue of target waypoints.

In one implementation, the management unit 20 for the queue of target waypoints is further configured to: judge, according to the collected piece of location information and the latest location information saved in the queue of target waypoints, whether the distance between a target waypoint corresponding to the collected piece of location information and a target waypoint corresponding to the latest location information saved in the queue of target waypoints reaches a preset first distance threshold; if the distance reaches the preset first distance threshold, it is judged that the first condition is met; if the distance fails to reach the preset first distance threshold, it is judged that the first condition is not met.

In one implementation, the management unit 20 for the queue of target waypoints is further configured to: according to the chronological order for collecting the pieces of location information, arrange the collected oldest location information at the end of the queue of target waypoints and arrange the collected latest location information at the head of the queue of target waypoints. The pieces of location information are arranged from the end of the queue to the head of the queue in chronological order for collecting the pieces of the location information.

The mobile control unit 30 is further configured to: after generating the control instruction, control, according to the control instruction, the mobile device to move towards the waypoints corresponding to the respective pieces of location information from the end to the head of the queue of target waypoints in turn; and once the mobile device reaches the waypoint corresponding to the piece of location information at the end of the queue, notify the management unit 20 for the queue of target waypoints to delete the location information at the end of the queue from the queue of target waypoints.

In one implementation, the piece of location information of the target waypoint saved in the queue of target waypoints includes: a relative location vector between each target waypoint and the mobile device.

The mobile control unit 30 is further configured to: according to a relative location vector $\{w_0, w_1, w_2, \ldots w_n\}$ between the mobile device and each target waypoint saved in the queue of target waypoints, generate a control instruction enabling the mobile device to move towards the respective target waypoints from the end to the head of the queue of target waypoints in turn. In the control process, a movement distance vector $\Delta X$ and a rotation angle vector $\Delta \theta$ of the mobile device is acquired according to a preset sampling period. In each sampling period, the relative location vector $\{w_0, w_1, w_2, \ldots w_n\}$ is transformed according to the acquired movement distance vector $\Delta X$ and rotation angle vector $\Delta \theta$ based on a formula $\{(w_i-\Delta X)T(\Delta \theta)\}$ to acquire a transformed relative location vector, where $i=0, 1, 2, \ldots n$, $T(\Delta \theta)$ represents a rotation transformation matrix. The transformed relative location vector is used to describe a new relative location between the path the mobile device moves and the target object.

Correspondingly, the control instruction is generated based on the latest relative location vector. For the diagram of the relative location vector transformation, please refer to FIG. 4.

An embodiment of the disclosure for the mobile control unit 30 to control the movement of a mobile device based on the relative location information between the mobile device and a target waypoint is illustrated below. However, it should be noted that the control method of the embodiment of the disclosure is not limited thereto and at least includes the control based on the relative location information between the mobile device and the target waypoint, and the control based on the absolute location information between the mobile device and the target waypoint.

It is assumed the mobile device can perform forward movement and steering movement, but cannot perform lateral movement. The relation between the path the target object travels and the mobile device is as shown in FIG. 5. Waypoint represents each point of the path the target object passes (that is, each waypoint saved in the queue of target waypoints), $\upsilon_f$ represents the translational velocity vector of the mobile device relative to the ground, $\omega_f$ represents the rotational velocity vector of the mobile device relative to the ground. A coordinate system is set up based on a target waypoint, where the positive direction of the X axis of the coordinate system is overlapped with the movement direction of the target object at the waypoint. In the coordinate system, the coordinate of the mobile device relative to the target object is denoted by $(x_0, y_0)$. The location $(x_0, y_0)$ is divided into a first relative location and a second relative location, that is, the deviation $(\Delta x, \Delta y)$ between the mobile device and the waypoint the mobile device needs to approach is calculated. The method for calculating $\Delta x$ and $\Delta y$ is not limited in the embodiment of the disclosure.

The purpose of the control in the embodiment of the disclosure is to acquire a control law of making $\Delta x$ and $\Delta y$ converged gradually. By implementing the control law, $\Delta x$ and $\Delta y$ are made converged to zero gradually, such that the mobile device moves to $(x_0, y_0)$ gradually. The control law of making $\Delta x$ and $\Delta y$ converged gradually may be designed as follows respectively:

For $\Delta x$, design a control law $\upsilon_r = f_x(\Delta x, t)$ of the forward velocity instruction $\upsilon_r$ is designed for a given mobile device. This control law drives $\Delta x$ to be converged to zero gradually, wherein t represents time. In a specific implementation, the control law may be a PID control law, or other control laws, which is not limited in the embodiment of the disclosure.

For $\Delta y$, a following cascade controller with inner loop and outer loop control is designed:

For the outer loop, an approach angle $\theta_\alpha \Delta y \times k$ in direct proportion to the distance is designed, as shown in FIG. 5, where k represents a proportionality coefficient and $\theta_\alpha$ represents the approach angle. The magnitude of k determines the angle in which the mobile device is tangent to the walking line of the target object. The bigger the k is, the bigger the angle in which the mobile device is tangent to the walking line of the target object is. And the mobile device orientation is corrected to be the same as the walking direction of the target object at a place closer to the walking line of the target object. Generally, the value of k is determined according to experiences and actual debugging.

For the inner loop: design a control law $\omega_r = f_y(\theta_e, t)$ for the rotational velocity of the mobile device is designed, where $\theta_e$ represents an error angle between the forward movement direction of the mobile device and the approach angle. The control law will continuously drive $\Delta y$ and $\theta_e$ to be converged to zero, as long as the mobile device is moving forwards. $f_y(\cdot, t)$ control law may be a PID control law, or other control laws, which is not limited in the embodiment of the disclosure. The embodiment of the disclosure does not limit the specific calculation method of $\theta_e$. Any methods capable of calculating $\theta_e$ in actual applications are intended to be included in the scope of protection of the embodiment of the disclosure.

In addition, in the embodiment of the disclosure, an arrival boundline may also be set for each waypoint. For example, using the distance from a corresponding waypoint to describe the corresponding boundline. For instance, the place with a distance of 3 cm from a certain waypoint is set as the boundline. When the mobile device moves to cross the boundline, it is considered that the mobile device reaches the corresponding waypoint, then the mobile control unit 30 deletes the location information of the waypoint from the queue of target waypoints, and the mobile device moves towards a next target waypoint in the queue of target waypoints.

By implementing the Embodiment 2 of the disclosure, the mobile device can record each target waypoint that the tracked target object passes, such that the mobile device is controlled to move towards the respective target waypoints in order. That is to say, the mobile device moves along the trace of the target object. In this way, the mobile device can better avoid obstacles during the tracking process, because the trace of the target object often has no obstacle. Moreover, since the tracking path of the mobile device provided by the embodiment of the disclosure is controllable (that is, the mobile device moves along the trace of the target object), even if the target object bypasses an obstacle, the mobile device can track the target well, and won't collide with the obstacle.

It should be noted that the method and mobile device for processing information provided by the embodiment of the disclosure are applicable to scenes of two-dimensional tracking, for example, applied to electro-mobiles and self-balancing vehicles. The embodiment of the disclosure also can be applied to scenes of three-dimensional space tracking, for example, applied to unmanned aerial vehicles. The principle of the implementation and the specific methods are described above.

In the embodiments provided in the disclosure, it should be understood that the disclosed method, device and electronic equipment may be implemented in other ways. The equipment embodiments described above are exemplary only. For example, the division of unit is a division of logical function merely, and other division methods may be adopted in an actual implementation. For example, a plurality of units or components may be combined, or may be integrated into another system, or some feature may be neglected or not executed. In addition, the coupling, or direct coupling, or communication connection between the displayed or discussed components may be implemented through some interfaces. The direct coupling or communication connection between equipment or units may be electrically, mechanically or in other forms.

The above unit described as a separate component may be or may not be physically separated. The component, shown as a unit, may be or may not be a physical unit, that is, it may be located at one place, or may be distributed on a plurality of network units. Part or all of units may be selected to realize the purpose of the embodiment solution according to actual needs.

In addition, the respective functional units in each embodiment of the disclosure may be integrated into a processing unit, or the respective units serve as separate units, or two or more units are integrated into a unit. The above integrated units may be implemented in the form of hardware, or in the form of a functional unit with hardware and software.

A skilled in the art can understand that: all or part of steps to implement the above method embodiments may be implemented through a program instructing related hardware. The program may be stored in a computer-readable storage medium and executes steps including the above method embodiments when the program is executed. The storage medium includes a mobile storage device, Read-Only Memory (ROM), Random Access Memory (RAM), diskette, compact disk or various medium capable of storing program codes.

Alternatively, when the above integrated units in the embodiments of the disclosure are implemented in the form of software functional modules and are sold or used as an independent product, they may be stored in computer-readable storage medium. Based on such understanding, the solution of the embodiment of the disclosure or the part making a contribution to the existing technology on essence may be embodied in the form of software product. This computer software product is stored in a storage medium, containing a number of instructions that enables a computer device (which might be a personal computer, a server or a piece of network equipment, etc.) to execute part or the entirety of the methods described in various embodiments of the disclosure. The aforementioned storage medium includes a mobile storage device, ROM, RAM, diskette compact disc or various medium capable of storing program codes.

In view of this, the embodiment of the disclosure further provides a computer-readable storage medium, containing a set of computer-executable instructions that are configured to execute the method for processing information described in the embodiment of the disclosure.

The above are the specific embodiments of the disclosure merely. However, the protection scope of the disclosure is not limited to this. Any variations or substitutions will be easily conceived by one skilled who is familiar with the technical field within the technical scope disclosed by the disclosure are intended to be within the scope of protection of the disclosure. Therefore, the scope of protection of the disclosure should be defined by the protection scope of the appended claims.

INDUSTRIAL APPLICABILITY

According to the solution of the embodiment of the disclosure, the mobile device is enabled to record the respective target waypoints that the tracked target object passes, such that the mobile device is controlled to move towards the respective target waypoints in order, that is to say, the mobile device moves along the trace of the target object. In this way, the mobile device can better avoid obstacles during the tracking process, because the trace of the target object often has no obstacle. Moreover, since the tracking path of the mobile device provided by the embodiment of the disclosure is controllable (that is, the mobile device moves along the trace of the target object), even if the target object bypasses an obstacle, the mobile device can track the target well, and won't collide with the obstacle.

The invention claimed is:

1. A method for processing information, applied to a mobile device, comprising:
   collecting, at a preset frequency, pieces of location information of a target object tracked by the mobile device, comprising:
   transmitting, by the mobile device, through an Ultra Wideband (UWB) unit of the mobile device, a signal to the target object at the preset frequency;
   receiving, by the mobile device, a reflected signal from a UWB beacon of the target object;
   calculating, by the mobile device, a relative distance between the mobile device and the target object based on a time of flight (TOF) according to a transmission time of the signal and a reception time of the reflected signal; and
   calculating, by the mobile device, a relative angle between the mobile device and the target object based on an angle of arrival (AOA) according to a transmission angle of the signal and an arrival angle of the signal reaching the target object;
   extracting a piece of location information meeting a first condition from the collected pieces of location information, and saving the extracted piece of location information in a queue of target waypoints, wherein each piece of location information in the queue of target waypoints is configured to describe a target waypoint, and the pieces of location information of the target waypoints saved in the queue of target waypoints are arranged in the chronological order for collecting the pieces of location information; and
   generating a corresponding control instruction according to the pieces of location information of the target waypoints saved in the queue of target waypoints, wherein the control instruction is configured to control the mobile device to move towards the respective target waypoints described in the queue of target waypoints in order.

2. The method for processing information according to claim 1, wherein the extracting a piece of location information meeting a first condition from the collected pieces of location information and saving the extracted piece of location information in a queue of target waypoints comprises:
   when a piece of location information of the target object is collected, judging whether the queue of target waypoints is null; if the queue of target waypoints is null, saving the collected piece of location information in the queue of target waypoints;
   if the queue of target waypoints is not null, judging, according to the collected piece of location information and the latest location information saved in the queue of target waypoints, whether the first condition is met; when it is judged that the first condition is met, saving the collected piece of location information in the queue of target waypoints, and when it is judged that the first condition is not met, not saving the collected piece of location information in the queue of target waypoints.

3. The method for processing information according to claim 2, wherein the judging, according to the collected piece of location information and the latest location information saved in the queue of target waypoints, whether the first condition is met comprises:
   judging, according to the collected piece of location information and the latest location information saved in the queue of target waypoints, whether a distance between a target waypoint corresponding to the collected piece of location information and a target waypoint corresponding to the latest location information saved in the queue of target waypoints reaches a preset first distance threshold; wherein if the distance reaches the preset first distance threshold, it is judged that the first condition is met; if the distance fails to reach the preset first distance threshold, it is judged that the first condition is not met.

4. The method for processing information according to claim 3, wherein the step that the pieces of location information of the target waypoints of the queue of target waypoints are arranged in the chronological order for collecting the pieces of location information comprises:
   according to the chronological order for collecting the pieces of location information, arranging the collected oldest location information at an end of the queue of target waypoints and arranging the collected latest location information at a head of the queue of target waypoints, the pieces of location information being arranged from the end of the queue to the head of the queue in chronological order for collecting the pieces of the location information;
   and after generating the control instruction, the method further comprises:
   controlling, according to the control instruction, the mobile device to move towards the target waypoints corresponding to the respective pieces of location information from the end to the head of the queue of target waypoints in turn; and once the mobile device reaches the target waypoint corresponding to the piece of location information at the end of the queue, deleting the piece of location information at the end of the queue from the queue of target waypoints.

5. The method for processing information according to claim 2, wherein the step that the pieces of location information of the target waypoints of the queue of target waypoints are arranged in the chronological order for collecting the pieces of location information comprises:
   according to the chronological order for collecting the pieces of location information, arranging the collected oldest location information at an end of the queue of target waypoints and arranging the collected latest location information at a head of the queue of target waypoints, the pieces of location information being arranged from the end of the queue to the head of the queue in chronological order for collecting the pieces of the location information;
   and after generating the control instruction, the method further comprises:
   controlling, according to the control instruction, the mobile device to move towards the target waypoints corresponding to the respective pieces of location information from the end to the head of the queue of target waypoints in turn; and once the mobile device reaches the target waypoint corresponding to the piece of location information at the end of the queue, deleting the piece of location information at the end of the queue from the queue of target waypoints.

6. The method for processing information according to claim 1, wherein the step that the pieces of location information of the target waypoints of the queue of target waypoints are arranged in the chronological order for collecting the pieces of location information comprises:
according to the chronological order for collecting the pieces of location information, arranging the collected oldest location information at an end of the queue of target waypoints and arranging the collected latest location information at a head of the queue of target waypoints, the pieces of location information being arranged from the end of the queue to the head of the queue in chronological order for collecting the pieces of the location information;
and after generating the control instruction, the method further comprises:
controlling, according to the control instruction, the mobile device to move towards the target waypoints corresponding to the respective pieces of location information from the end to the head of the queue of target waypoints in turn; and once the mobile device reaches the target waypoint corresponding to the piece of location information at the end of the queue, deleting the piece of location information at the end of the queue from the queue of target waypoints.

7. The method for processing information according to claim 6, wherein the extracted piece of location information of the target waypoint saved in the queue of target waypoints comprises: a relative location vector between each target waypoint and the mobile device;
the generating a corresponding control instruction according to the piece of location information of the target waypoint saved in the queue of target waypoints comprises:
according to a relative location vector $\{w_0, w_1, w_2, \ldots w_n\}$ between the mobile device and each target waypoint saved in the queue of target waypoints, generating a control instruction enabling the mobile device to move towards the respective target waypoints from the end to the head of the queue of target waypoints in turn; in the control process, acquiring a movement distance vector $\Delta X$ and a rotation angle vector $\Delta\theta$ of the mobile device according to a preset sampling period; in each sampling period, transforming the relative location vector $\{w_0, w_1, w_2, \ldots w_n\}$ according to the acquired movement distance vector $\Delta X$ and rotation angle vector $\Delta\theta$ based on a formula $\{(w_i-\Delta X)T(\Delta\theta)\}$ to acquire a transformed relative location vector, where i=0, 1, 2, . . . n, $T(\Delta\theta)$ represents a rotation transformation matrix;
correspondingly, the control instruction is generated based on the latest relative location vector.

8. A mobile device, comprising:
a location information collection unit which is configured to collect, at a preset frequency, pieces of location information of a target object tracked by the mobile device, comprising:
transmitting, by the mobile device, through an Ultra Wideband (UWB) unit of the mobile device, a signal to the target object at the preset frequency;
receiving, by the mobile device, a reflected signal from a UWB beacon of the target object;
calculating, by the mobile device, a relative distance between the mobile device and the target object based on a time of flight (TOF) according to a transmission time of the signal and a reception time of the reflected signal; and
calculating, by the mobile device, a relative angle between the mobile device and the target object based on an angle of arrival (AOA) according to a transmission angle of the signal and an arrival angle of the signal reaching the target object;
a management unit for a queue of target waypoints, which is configured to extract a piece of location information meeting a first condition from the collected pieces of location information, and save the extracted piece of location information in the queue of target waypoints, wherein each piece of location information in the queue of target waypoints is configured to describe a target waypoint, and the pieces of location information of the target waypoints saved in the queue of target waypoints are arranged in the chronological order for collecting the pieces of location information; and
a mobile control unit which is configured to generate a corresponding control instruction according to the pieces of location information of the target waypoints saved in the queue of target waypoints, wherein the control instruction is configured to control the mobile device to move towards the respective target waypoints described in the queue of target waypoints in order.

9. The mobile device according to claim 8, wherein the management unit for the queue of target waypoints is further configured to:
when a piece of location information of the target object is collected by the location information collection unit, judge whether the queue of target waypoints is null; if the queue of target waypoints is null, save the collected piece of location information in the queue of target waypoints;
if the queue of target waypoints is not null, judge, according to the collected piece of location information and the latest location information saved in the queue of target waypoints, whether the first condition is met; when it is judged that the first condition is met, save the collected piece of location information in the queue of target waypoints, and when it is judged that the first condition is not met, not save the collected piece of location information in the queue of target waypoints.

10. The mobile device according to claim 9, wherein the management unit for the queue of target waypoints is further configured to:
judge, according to the collected piece of location information and the latest location information saved in the queue of target waypoints, whether a distance between a target waypoint corresponding to the collected piece of location information and a target waypoint corresponding to the latest location information saved in the queue of target waypoints reaches a preset first distance threshold; wherein if the distance reaches the preset first distance threshold, it is judged that the first condition is met; if the distance fails to reach the preset first distance threshold, it is judged that the first condition is not met.

11. The mobile device according to claim 10, wherein the management unit for the queue of target waypoints is further configured to: according to the chronological order for collecting the pieces of location information, arrange the collected oldest location information at an end of the queue of target waypoints and arrange the collected latest location information at a head of the queue of target waypoints, the pieces of location information being arranged from the end of the queue to the head of the queue in chronological order for collecting the pieces of the location information;
the mobile control unit is further configured to: after generating the control instruction, control, according to the control instruction, the mobile device to move towards the target waypoints corresponding to the respective pieces of location information from the end to the head of the queue of target waypoints in turn; and once the mobile device reaches the target waypoint corresponding to the piece of location information at the end of the queue, notify the management unit for the queue of target waypoints to delete the location information at the end of the queue from the queue of target waypoints.

12. The mobile device according to claim 9, wherein the management unit for the queue of target waypoints is further configured to: according to the chronological order for collecting the pieces of location information, arrange the collected oldest location information at an end of the queue of target waypoints and arrange the collected latest location information at a head of the queue of target waypoints, the pieces of location information being arranged from the end of the queue to the head of the queue in chronological order for collecting the pieces of the location information;

the mobile control unit is further configured to: after generating the control instruction, control, according to the control instruction, the mobile device to move towards the target waypoints corresponding to the respective pieces of location information from the end to the head of the queue of target waypoints in turn; and once the mobile device reaches the target waypoint corresponding to the piece of location information at the end of the queue, notify the management unit for the queue of target waypoints to delete the location information at the end of the queue from the queue of target waypoints.

13. The mobile device according to claim 8, wherein the management unit for the queue of target waypoints is further configured to: according to the chronological order for collecting the pieces of location information, arrange the collected oldest location information at an end of the queue of target waypoints and arrange the collected latest location information at a head of the queue of target waypoints, the pieces of location information being arranged from the end of the queue to the head of the queue in chronological order for collecting the pieces of the location information;

the mobile control unit is further configured to: after generating the control instruction, control, according to the control instruction, the mobile device to move towards the target waypoints corresponding to the respective pieces of location information from the end to the head of the queue of target waypoints in turn; and once the mobile device reaches the target waypoint corresponding to the piece of location information at the end of the queue, notify the management unit for the queue of target waypoints to delete the location information at the end of the queue from the queue of target waypoints.

14. The mobile device according to claim 13, wherein the extracted piece of location information of the target waypoint saved in the queue of target waypoints comprises: a relative location vector between each target waypoint and the mobile device;

the mobile control unit is further configured to: according to a relative location vector $\{w_0, w_1, w_2, \ldots w_n\}$ between the mobile device and each target waypoint saved in the queue of target waypoints, generate a control instruction enabling the mobile device to move towards the respective target waypoints from the end to the head of the queue of target waypoints in turn; in the control process, acquire a movement distance vector $\Delta X$ and a rotation angle vector $\Delta \theta$ of the mobile device according to a preset sampling period; in each sampling period, transform the relative location vector $\{w_0, w_1, w_2, \ldots w_n\}$ according to the acquired movement distance vector $\Delta X$ and rotation angle vector $\Delta \theta$ based on a formula $\{(w_i-\Delta X)T(\Delta\theta)\}$ to acquire a transformed relative location vector, where i=0, 1, 2, ... n, $T(\Delta\theta)$ represents a rotation transformation matrix;

correspondingly, the control instruction is generated based on the latest relative location vector.

15. A computer storage medium storing computer-executable instructions, the computer-executable instructions being used to control a processer to execute a method for processing information, the method comprising:

collecting, at a preset frequency, pieces of location information of a target object tracked by a mobile device, comprising:
transmitting, by the mobile device, through an Ultra Wideband (UWB) unit of the mobile device, a signal to the target object at the preset frequency;
receiving, by the mobile device, a reflected signal from a UWB beacon of the target object;
calculating, by the mobile device, a relative distance between the mobile device and the target object based on a time of flight (TOF) according to a transmission time of the signal and a reception time of the reflected signal; and
calculating, by the mobile device, a relative angle between the mobile device and the target object based on an angle of arrival (AOA) according to a transmission angle of the signal and an arrival angle of the signal reaching the target object;

extracting a piece of location information meeting a first condition from the collected pieces of location information, and saving the extracted piece of location information in a queue of target waypoints, wherein each piece of location information in the queue of target waypoints is configured to describe a target waypoint, and the pieces of location information of the target waypoints saved in the queue of target waypoints are arranged in the chronological order for collecting the pieces of location information; and generating a corresponding control instruction according to the pieces of location information of the target waypoints saved in the queue of target waypoints, wherein the control instruction is configured to control the mobile device to move towards the respective target waypoints described in the queue of target waypoints in order.

* * * * *